March 23, 1926.
S. K. DENNIS
FENDER FOR CULTIVATORS
Filed Oct. 25, 1922
1,577,452
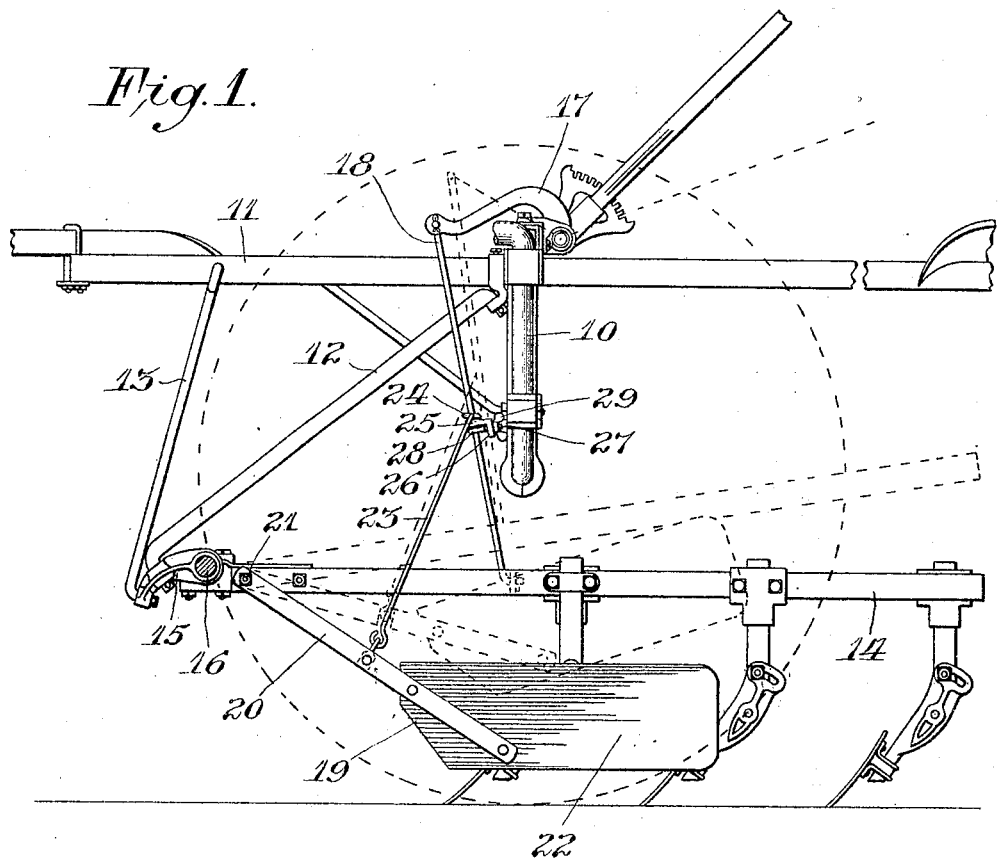
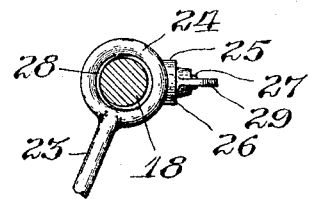
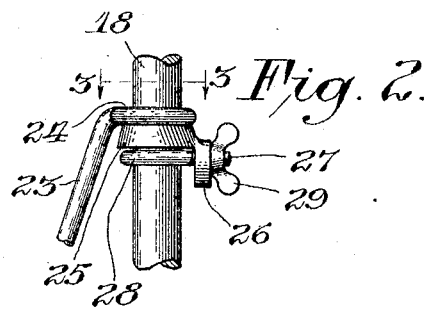
Inventor.
Samuel K. Dennis,
By H. P. Doolittle
Atty.

Patented Mar. 23, 1926.

1,577,452

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

FENDER FOR CULTIVATORS.

Application filed October 25, 1922. Serial No. 596,743.

*To all whom it may concern:*

Be it known that I, SAMUEL K. DENNIS, a citizen of the United States, residing at Chicago, in the county of Cook and State of Illinois, have invented certain new and useful Improvements in Fenders for Cultivators, of which the following is a full, clear, and exact specification.

My invention is directed to improvement in the manner of mounting the fenders used on straddle row cultivators, my principal object being to mount the fenders so as to cause differential movement between each fender and the adjacent cultivator beam when the fenders and beams are raised and lowered together, thereby loosening clods and trash which frequently lodge between the fenders and cultivator shovels as distinguished from the ordinary constructions where the fenders and beams move with the same speed. Other objects are to so connect the fenders to the lifting means for the beams that the fenders may be readily adjusted separately and may move upwardly independently of the beams.

These and other minor objects are attained by the combination and details of construction, or the equivalents thereof, hereinafter described and claimed.

Referring to the drawings—

Fig. 1 is a side view showing a cultivator equipped with my invention;

Fig. 2 is an enlarged detail view of the connection for the fender lifting link; and Fig. 3 is a detail view of the same connection viewed on line 3—3 of Fig. 2.

In the accompanying drawing, my invention is illustrated as combined with a straddle row cultivator comprising the arched axle 10 on which is mounted the frame 11. The frame carries a main push rod 12 and a pendulum rod 13 for each cultivator beam 14 and each beam is connected to the rods 12 and 13 through a bracket 15 which is journaled on one arm 16 of the usual beam supporting arch (not shown). The supporting rods 12 and 13 are pivotally connected to the bracket 15 as shown in Fig. 1 to permit a certain amount of lateral movement of the beams 14 and their supporting arches. The lifting mechanism for each beam comprises the usual bell crank lever 17 connected by the lifting link 18 with the intermediate portion of the beam 14. The particular cultivator structure just described is not essential to my present invention except as certain parts thereof co-operate with the parts comprising it, and the invention may be applied to cultivators of different structures.

To simplify the description, I have illustrated the invention in connection with only one beam and fender but it will be understood that the fenders and beams are ordinarily employed in pairs.

The organization and parts comprising the invention include the fender 19 which has a drag bar 20 that is pivoted at 21 to the forward end of the cultivator beam 14 at a point adjacent the pivot of the beam at 16. The drag bar 20 is shown in this instance as rigidly secured to a rectangular fender plate 22 but any of the fender devices in common use may be substituted for that shown. The lifting and lowering means for the fender comprises the auxiliary lifting connection 23 which may be either flexible or rigid and has its lower end attached to the drag bar 20 of the fender at a point considerably in advance of the point of connection of the lifting link 18 to the beam. That is, the connection 23 is attached to the drag bar 20 nearer the drag bar pivot 21 than the lifting link 18 is to the pivot of the beam 14. In practice, it has been found preferable to have the lifting connection to the beam substantially twice as far from its pivot as the point of attachment of the auxiliary connection or link 23 to the drag bar is from the pivot 21 thereof. At its upper end, the connection 23, if in the form of the rigid link shown, is formed with an eye 24 which loosely encircles link 18 and is free to move longitudinally thereof. Downward movement of the eye 24 on link 18 is limited by a stop collar 25 which has a laterally projecting eye 26 through which there projects the screw threaded stem 27 of a clamping eye 28 encircling rod 18. A thumb nut 29 is threaded on the stem 27 and bears against eye 26 to clamp the parts in adjusted position on link 18. This construction permits rod 23 to slide upwardly on link 18 when the fender rides over an obstruction and the height of the fender from the ground is regulated by the position of the stop collar 25.

With the construction and arrangement described, it will be evident that the points at which the lifting and lowering power is applied to the beam and fender respectively are at materially different distances from the respective pivot points of the beam and fender. Preferably the one for the beam is substantially twice as far from its pivot as the other, consequently the fender will move through a greater arc than the beam whenever the lever 17 is swung to raise or lower the cultivator beam and fender. This differential movement serves to release or dislodge any clods etc. which may have become packed or lodged between the fenders and the adjacent shovels on the cultivator beam. At the same time, the connection of the auxiliary link 23 to the main lifting link 18 is such as to permit the fender to ride over obstructions freely and independently of the cultivator beam even though a rigid connection is used at 23, and the stop collar 25 permits easy adjustment of the height of the fender.

While the construction and arrangement disclosed exemplifies the preferred embodiment of my invention, it will be obvious that modifications are possible within the scope of the following claims:

I claim as my invention:

1. The combination with a pivotally mounted cultivator beam and the lifting means therefor, of a fender pivoted adjacent the pivot of said beam, a lifting link between the lifting means and the beam, and an auxiliary link between the fender and said lifting link, the auxiliary link having a slidable connection with the lifting link above a stop collar thereon and the connection of the lifting link to the beam being at a point substantially twice as far from its pivot as the point of attachment of the auxiliary link to the fender is from the pivot thereof.

2. The combination with a pivotally mounted cultivator beam and the lifting means therefor, of a link connecting said beam to the lifting means, a fender having a drag bar pivoted adjacent the pivot of said beam, an auxiliary connection having one end attached to said drag bar and its other connected to said link so that this latter end of the auxiliary connection slides upon said link during the normal operation of the cultivator, and means for adjusting the latter end connection longitudinally of the link.

3. The combination with a pivotally mounted cultivator beam and the lifting means therefor, of a link connecting said beam to the lifting means, a pivotally mounted fender, and an auxiliary connection between said fender and link including an eye on said connection engaging the link, an adjustable collar on the link beneath said eye, and means for retaining said collar in position on the link.

In testimony whereof I affix my signature.

SAMUEL K. DENNIS.